United States Patent [19]

Adiletta

[11] Patent Number: 5,793,658

[45] Date of Patent: Aug. 11, 1998

[54] METHOD AND APPARATUS FOR VIEDO COMPRESSION AND DECOMPRESSION USING HIGH SPEED DISCRETE COSINE TRANSFORM

[75] Inventor: Matthew Adiletta, Worcester, Mass.

[73] Assignee: Digital Equipment Coporation, Maynard, Mass.

[21] Appl. No.: 591,204

[22] Filed: Jan. 17, 1996

[51] Int. Cl.$^6$ .................................................. G06F 17/14
[52] U.S. Cl. ........................ 364/725.03; 364/715.02; 382/166; 382/232; 382/233
[58] Field of Search .......................... 364/725; 348/384, 348/404; 358/432, 433, 426; 382/304, 166, 236; 385/400; 395/400; 345/201

[56] References Cited

U.S. PATENT DOCUMENTS

| | | | |
|---|---|---|---|
| 4,881,192 | 11/1989 | Woudsma et al. | 364/725 |
| 5,053,985 | 10/1991 | Friedlander et al. | 364/725 |
| 5,181,183 | 1/1991 | Miyazaki | 364/725 |
| 5,341,318 | 8/1994 | Balkanski et al. | 364/725 |
| 5,379,351 | 1/1995 | Fandrianto et al. | 382/41 |
| 5,452,466 | 9/1995 | Fettweis | 395/800 |
| 5,461,679 | 10/1995 | Normile et al. | 382/304 |
| 5,467,131 | 11/1995 | Bhaskaran et al. | 348/384 |
| 5,587,726 | 12/1996 | Moffat | 345/201 |

OTHER PUBLICATIONS

Fast Algorithms for the Discrete Cosine Transform —Feig and Winograd.
A New Algorithms to Compute the Discrete Cosine Transform —Byeong Gi Lee.
A Fast Comutational Algorithms for the Discrete Cosine Transform —Wen–Hsiung Chen, C. Harrison Smith, and S.C. Fralick.
ITU–TRecommendation H.261 —Line Transmission of Non–Telephone Signals.
Practical Fast 1–D ACT Algorithms With 11 Multiplications —Christoph Loeffler, Adriaan Ligtenberg**, and George S. Moschytz*.
A 160–Mpixel/s IDCT Processor for HDTV.
A Single Chip Solution For An 8 By 8 By Two Dimen–sional DCT —Adrianne Ligtenberg, Jay H. O'Neill.

*Primary Examiner*—Reba I. Elmore
*Assistant Examiner*—Monica Lewis
*Attorney, Agent, or Firm*—Ronald C. Hudgens; Arthur W. Fisher

[57] ABSTRACT

A method and apparatus performs high speed forward or reverse Discrete Cosine Transform (DCT) for video compression and decompression that is optimized in both directions and which uses minimal hardware. This invention can be used to improve the speed of electronic transmission of images, decrease the electronic bandwidth necessary to transmit images electronically, increase the density of electronic storage of images, and speed up image enhancement operations.

17 Claims, 12 Drawing Sheets

TABLE 96

```
/* stage 1 */
   r3 = o2 + o5;
   r6 = o2 - o5;
/* stage 2 */
   r1 = o0 + o7;
   r8 = o0 - o7;
   r18 = r6 * lc6;
/* stage 3 */
   r2 = o1 + o6;
   r7 = o1 - o6;
   r21 = r8 * lc7;
/* stage 4 */
   r4 = o3 + o4;
   r14 = r6 + r7;
   r20 = r7 * lc4;
/* stage 5 */
   r5 = o3 - o4;
   r11 = r2 - r3;
   r19 = r14 * lc5;
/* stage 6 */
   r10 = r2 + r3;
   r16 = r5 * lc9;

/* stage 7 */
   r12 = r1 - r4;
   r13 = r8 + r5;
   r24 = r11 * lc3;
/* stage 8 */
   r9 = r1 + r4;
   r15 = r11 + r12;
   r26 = r12 * lc1;
/* stage 9 */
   r22 = r9 + 210;
   r25 = r15 * lc2;
/* stage 10 */
   r23 = r9 - r10;
   r17 = r13 * lc8;
/* stage 11 */
   r28 = r18 + r19;
   r34 = r26 + r25;

/* stage 12 */
   r30 = r21 + r17;
   r33 = r25 + r24;
   r31 = r22 * lc11;
/* stage 13 */
   r29 = r19 + r20;
   r36 = r30 - r28;
   r32 = r23 * lc11;
/* stage 14 */
   r27 = r16 + r17;
   r38 = r28 + r30;
   r40 = r36 * lc10;
/* stage 15 */
   r35 = r27 + r29;
/* stage 16 */
   r37 = r27 - r29;
   r39 = r35 + r38;
/* stage 17 */
   r42 = r35 - r38;
   r41 = r37 * lc10;
/* stage 18 */
   r41 = r37 * lc10;
```

Figure 6

INVERSE DCT SPIDER

TABLE 9B

```
/* stage 1 */
    r2 = o5 * lc10;
/* stage 2 */
    r5 = o0 + o4;
    r6 = o0 - o4;
    r3 = o3 * lc10;
/* stage 3 */
    r1 = o1 + o7;
    r4 = o1 - o7;
    r13 = r6 * lc11;
/* stage 4 */
    r7 = o6 + o2;
    r8 = r1 + r3;
    r14 = o6 * lc3;
/* stage 5 */
    r11 = r2 + r4;
    r10 = r1 - r3;
    r15 = r7 * lc2;
/* stage 6 */
    r9 = r4 - r2;
    r17 = r11 + r8;
    r16 = o2 * lc1;
```

```
/* stage 7 */
    r18 = r9 + r10;
    r25 = r10 * lc4;
/* stage 8 */
    r20 = r15 + r16;
    r24 = r18 * lc5;
/* stage 9 */
    r19 = r14 + r15;
    r23 = r9 * lc6;
/* stage 10 */
    r28 = r19 + r13;
    r33 = r25 + r24;
    r21 = r8 * lc9;
/* stage 11 */
    r29 = r13 - r19;
    r36 = r28 + r33;
    r22 = r17 * lc8;
```

```
/* stage 12 */
    r32 = r23 + r24;
    r41 = r28 - r33;
    r12 = r5 * lc11;
/* stage 13 */
    r31 = r21 + r22;
    r37 = r29 + r32;
    r26 = r11 * lc7;
/* stage 14 */
    r30 = r12 - r20;
    r40 = r29 - r32;
/* stage 15 */
    r27 = r20 + r12;
    r38 = r30 + r31;
/* stage 16 */
    r34 = r22 + r26;
    r39 = r30 - r31;
/* stage 17 */
    r35 = r27 + r34;
/* stage 18 */
    r42 = r27 - r34;
```

*Figure 9*

METHOD AND APPARATUS FOR VIEDO COMPRESSION AND DECOMPRESSION USING HIGH SPEED DISCRETE COSINE TRANSFORM

BACKGROUND OF THE INVENTION

FIELD OF THE INVENTION

This invention relates generally to digital signal processing for storage or transmission of electronic images, and more specifically, to image compression and decompression using Discrete Cosine Transform (DCT) and Inverse Discrete Cosine Transform (IDCT).

BACKGROUND OF THE INVENTION

Generally, operations on video images are becoming more frequent in today's world. A video image can represent any combination of photographs, drawings, documents, text or other such audiovisual works including those which, when shown in succession, impart the impression of motion. Video images are typically represented by video signals that are processed to improve video quality and remove video defects and errors prior to storage in any of a variety of storage devices, and/or transmission over communication channels. Uses of image compression/decompression include multimedia presentations, live video conferences, and "Video On Demand".

However, electronic storage of video images consumes large quantities of memory storage and transmission of video images requires high transmission bandwidth, both of which are costly to provide. This is often true of scientific and engineering research monographs, for example, where the text and figures or photographs must be stored together in electronic memory as they appeared in the original publication.

An approach known in the art to decrease the memory storage and the high bandwidth requirements of video images is to use data compression techniques to compress video signals before storage or before transmission. A known data compression technique uses the Discrete Cosine Transform (DCT) and Inverse Discrete Cosine Transform (IDCT) to compress the image data contained in video signals, and the IDCT to decompress the previously compressed image data.

The DCT and the IDCT are matrix operations defined by the frequency transformed summation over all x's and y's of a series of cosine functions given as the product of $\cos[(2x+1)x\Pi/16]$ times $\cos[(2x+1)y\Pi/16]$, where x and y are variables representing signal phase. Since all elements of the matrix are cosine functions, the matrix is orthogonal, and can therefore be performed by a sequence of row element additions and multiplications followed by a sequence of column additions and multiplications. For example, a 2-Dimensional 8×8 point DCT and IDCT may be performed as a series of eight 1-Dimensional 1×8 point row transforms, whose results are input to a series of eight 1-Dimensional 1×8 point column transforms (for a total of sixteen 1×8 transforms).

The benefit of using the DCT for electronically storing a video image can be illustrated with respect to a monochrome image of a square checkerboard array of 10 light and dark squares on a side. In this case, there is an image containing a total of 50 light squares and 50 dark squares. Each of the squares can be made up of 10 minimum spots of light, called "pixels" or picture elements, on each side (i.e., each square consists of 100 pixels). Thus the total picture has a total of 100×100 pixels which would typically (without compression) occupy 10,000 memory locations, i.e., one location for each pixel in the image. Using the DCT to first compress this checkerboard image (e.g., through reduction in redundancy) can reduce memory storage space required for this simplified case to 100 memory locations, one for each differently shaded area. Thus, using the DCT in this case results in a reduction of required memory space by a factor of 100 (i.e., a one to one hundred compression ratio). In practice, operating on typical real world images, usual compression ratios of about one to eight are achieved. Never-the-less, the utility of the data compression technique is clear since it requires less space to store.

The DCT was first presented in 1974 by Ahmed, Natarajan and Rao, Discrete Cosine Transform, IEEE Transaction on Computers, Vol. C-23, pp 90–93, and has found wide usage in image processing and data compression. A preferred implementation of the DCT and IDCT is in hardware using integrated logic arrays, but these transforms can also be implemented using firmware or software executed by general purpose microcomputers.

This transform is a key feature in industry standards for video images, such as the ISO-IEC JTC1/SC2/WG11 MPEG standard for motion video, the ISO-IEC JTC1/SC2/WG8 JPEG standard for still images, and P×64 H.261 Recommendation A standard for video conferencing, (CCITT Line Transmission for Non-telephone signals, A video Codec for Audio Visual Services at P×64 Kbits/second Video Transmission, H.261 Recommendation, Annex A, 1990), hereinafter "H.261 Annex A". MPEG and P×64 are also internationally recognized video compression standards and additionally specify a precision requirement for the Inverse Discrete Cosine Transform in the H.261 Annex A standard.

There are many different implementations of the Discrete Cosine Transform (DCT) known in the art, each requiring specific numbers of adders and multipliers to perform the transformations. The basic benchmark against which all subsequent DCT's have been judged is the Lee approach. This method performs 29 additions and 14 multiplications for each 1×8 bit transform block. Implemented with an apparatus having 4 adders and 2 multipliers, each 1×8 one dimensional (1-D) transform is completed in 17 machine cycles, where a machine cycle is the time required to perform an addition of two operands and save the sum in a memory register. This implementation has a disadvantage of requiring costly hardware due to the high number of multipliers and the 35 bits of data path width required to achieve the precision specified by H.261 Annex A. Further information on this technique is available in "A New Algorithm to Compute The DCT", by Byeond Gi Lee in the IEEE Trans on Acoustics, Speech, and Signal Processing, Vol. 32-#6, Dec. 1984.

Another widely know DCT is the Smith/Chen/Fralic transform. This method performs 26 additions and 16 multiplications for each 1×8 bit transform block. Implemented with an apparatus having 4 adders and 2 multipliers, each 1×8 one dimensional transform is completed in 11 machine cycles. This method has a benefit of having the DCT and IDCT running symmetrically, which aids in scheduling the various calculations required for compression of video images. In this context, "symmetrical" means that the DCT and IDCT are performed in the same number of cycles, and thus can efficiently use the same hardware. The Smith/Chen/Fralic approach has a disadvantage of requiring a large intermediate storage memory array as opposed to the Lee approach, and also of requiring a fairly wide data path of 24 bits to achieve the precision specified in H.261 Annex A.

Further information on this technique is available in "A Fast Computational Algorithm for the DCT", by Wen-Hsiung Chen, Smith, Fralick, IEEE Trans on Comm. Vol 25, #9 Sept. 1977.

Another method used is called the "Decimation in Frequency" method. This method performs 26 additions and 12 multiplications for each 1×8 bit transform block. Implemented with an apparatus having 4 adders and 1 multipliers, each 1×8 one dimensional transform is completed in 18 machine cycles. An advantage of using only 12 multiplications stems from multiplications being typically slower operations than additions, resulting in increased time to perform the transform. An additional advantage is that multipliers take up typically more "circuit area" (i.e., the total area on the chip occupied by the circuit) than required by adders on an electronic device. As a result, the fewer multipliers used and the fewer multiplications done in an operation, the faster and cheaper the operation can be performed. This particular method requires a relatively wide data path of 32 bits to achieve the precision specified by H.261 Annex A. Further information on this technique is available in a textbook named, "DCT : Algorithms, Advantages, Applications", by Rao and Yip, Academic Press, 1990.

Another DCT method used is called "Decimation in Time". This method utilizes 26 additions and 16 multiplications. As a result of the number of required multiplications, it is a slower transform method. Further information on this technique is available in "DCT : Algorithms, Advantages, Applications", by Rao and Yip, Academic Press, 1990.

Yet another known method is the Ligtenberg Rotators. This method performs 29 additions and 11 multiplications for each 1×8 bit transform block. Implemented with an apparatus having 2 adders and 2 multipliers, each 1×8 one dimensional transform is completed in 18 machine cycles. This is a low hardware approach, so it is compact and has a low circuit area, but it is typically slow for a transform with only 29 additions and 11 multiplications. This may be due to poor scheduling of operations such that the additions must be completed before the multiplications begin. This method is used because it requires relatively less local memory storage space. Further information on this technique is available in "A Single Chip Solution for an 8×8 2-Dimensional DCT", Adriaan Ligtenberg, IEEE Trans on Circuits and Systems, April 1987, Page 1128.

Another known method is called the "Feig Scaled DCT". This method performs 29 additions and 5 multiplications for each 1×8 bit transform block. Implemented with an apparatus having 4 adders and 1 multipliers, each 1×8 one dimensional transform is completed in 18 machine cycles. However, the process is asymmetric, requiring separate circuits to perform the compression and decompression operations. Further information on this technique is available in "Fast Algorithm for the DCT", Ephraim Feig, IEEE Trans on Signal Processing, Sept. 1992, Page 2174.

Yet another known asymmetric method is the Reutz IDCT transform. This transform has the best performance despite requiring the largest number of transistors, because of the low number of clock cycles required to complete the IDCT. Again, this transform is not regarded as a practical method for many video systems since it is unsymmetrical and only performs the IDCT. Further information on this technique is available in "160-Mpixel/sec IDCT Processor for HDTV", Peter Reutz, IEEE Microelectronics, Oct. 1992, Page 28.

With reference to the above discussion, it is clear that the storage and transmission of video signals will benefit from the availability of efficient and inexpensive compression and decompression transforms. Accordingly, it is a purpose of this invention to describe a method and apparatus for performing high speed forward and inverse Discrete Cosine Transform for video compression and decompression that is efficient in both directions and which uses minimal hardware.

SUMMARY OF THE INVENTION

The invention resides in systems for performing data compression and decompression using DCT and IDCT transforms that require only two adder circuits and only one multiplier circuit. With regard to this invention, the term "functional unit" is used to denote a logic operational element such as an adder, multiplier or memory. It is not used to designate any unitary feature of the operational elements; distributed operational elements are considered to be within the scope of the present invention.

The above noted economy in the number of functional units, (i.e., adder and multiplier components that perform the transforms) results from the use of a specific "spider diagram", which the inventor developed and recognized as providing advantages over the above described prior art.

Generally speaking, a spider diagram is an ordered list of operations between a group of parallel data memory registers that pictorially shows what is occurring during a mathematical transformation such as a Fourier Transform or a DCT. Spider diagrams are further discussed in "Practical Fast I-D DCT Algorithms with Multiplications", by Loeffler, Ligtenberg, Moschytz as published in the IEEE Proceedings of Acoustics, Speech, and Signal Processing, May 23, 1989, Vol II pages 988–991. The use of spider diagrams allows optimization of timing and ordering of mathematical operations of a DCT transformation in a computer system to improve the speed and decrease the data path width and amount of hardware required for the operations.

The inventor recognized that certain spider diagram configurations resulted in a more efficient system for performing video signal data compression and decompression than was possible in the above described prior art. A significant step in attaining the increased efficiency is to schedule the various operations so as to keep all of the functional units busy, while still minimizing the amount of memory storage required for the intermediate results, and minimizing the number of functional units. The reductions in the amount of memory storage and the number of functional units required, reduces the "circuit area", which is directly proportional to the number of elements required. Reducing the total circuit area results in faster and lower cost circuits.

More specifically, an apparatus for video compression and decompression utilizing a DCT and IDCT in accordance with this aspect of the invention has a video image source, a memory, a double buffer circuit, and at least one functional unit for calculations. The at least one functional unit has two adder circuits, each of the adder circuits having an adder with associated memory register circuits, one and only one multiplier circuit with associated memory registers, and an incrementer circuit that reduces rounding error.

The operation of the functional units is scheduled such that the order of operations and the number of operations performed by the apparatus described in the previous paragraph are such that both the DCT and IDCT are performed in the same number of cycles. Accordingly, the apparatus constitutes a symmetrical arrangement, which can be used for both compression and decompression.

The following is a chart which provides a comparison of the present invention with the above described prior art in an easily understandable format. The first column indicates the name of the method. The second column shows the approximate number of transistors that the transform requires, thus giving a relative indication of the circuit area. The third column is the approximate number of clock cycles required to perform an 8×8 bit block of data transform. This indicates relative speed, i.e., how fast the method would be performed, compared to the other methods, on the same computer. The fourth column is a figure of merit obtained from the product of the number of transistors and the number of cycles divided by one million. The smaller the figure of merit, the faster the circuit performs, and the smaller and less expensive the circuit is. The fifth column shows whether or not the circuit is symmetrical, i.e., does it do both the DCT and the inverse DCT. Symmetrical DCT and IDCT operation is required to make the system fast and inexpensive, since then only one circuit, instead of two, is required to perform all necessary transforms.

| Method | Transistors | cycles | Merit | Symmetric |
| --- | --- | --- | --- | --- |
| Deci in Freq | 40K | 350 | 14 | yes |
| Lee | 60K | 300 | 18 | yes |
| Smith | 70K | 250 | 17 | no |
| Deci in Time | 75K | 200 | 15 | yes |
| Feig | 80K | 150 | 12 | no |
| Ligtenberg | 80K | 400 | 32 | yes |
| Reutz | 125K | 40 | 5 | no, IDCT only |
| Present Invention | 39K | 272 | 11 | yes |

It can be seen that the present invention is an improvement over the above described prior art methods of DCT data compression because it uses 39,000 (i.e., 39K) transistors, only 136 clock cycles, and has the best (i.e., lowest) figure of "merit" of any of the above described symmetric transforms. Only the non-symmetric methods have similar figures of merit, and as discussed above, non-symmetric transforms (such as IDCT only transforms) are not practical for many video applications.

A further aspect of the present invention resides in a distributed memory arrangement in which memory for storing intermediate calculated values generated by the functional units is provided by memory registers allocated and located proximate to each of the adders and multipliers. This results in improved speed of operation and a reduced number of computer cycles to complete a transform.

A further aspect of the present invention resides in an incrementer circuit which rounds intermediate stored numbers so that overall accuracy is increased. The incrementer can be implemented using either or both of two methods to increase DCT accuracy. The first method is to arrange the order of operations so that small numbers are added together before combining them with larger numbers. This minimizes the magnitude of the errors introduced by the rounding operation. The second method to obtain improved DCT accuracy preferably uses a rounding technique called "2s complement non-bias rounding". In this technique, every intermediate value, prior to being stored back in the double buffer memory for future use, is rounded to the nearest whole number, except in the case when the intermediate value is exactly equal to positive or negative 0.5. If the value of the intermediate value is positive 0.5, the rounding operation is upward, i.e., away from zero. If the value of the intermediate value is negative 0.5, the rounding operation is downward, i.e., away from zero. This requires the circuit to specifically detect negative intermediate values which are exactly at the half boundary, and truncate them versus rounding them. In all other cases negative half is rounded.

More specifically, these aspects of the invention can be implemented in a system for providing signal compression and decompression utilizing a discrete cosine transform and an inverse discrete cosine transform. The system includes means coupled to a signal source for receiving a signal, and performing a DCT and IDCT.

The system has functional units for performing the transforms using two adder circuits, each of the adders having associated memory register circuits, and a multiplier circuit having associated memory registers. The system has an incrementer circuit connected to both the memory registers and the functional units for rounding intermediate calculated values, resulting in a compressed video signal and a decompressed video signal.

BRIEF DESCRIPTION OF THE DRAWINGS

The above and further advantages of the invention may be better understood by referring to the following description in conjunction with the accompanying drawings, in which:

FIG. 6 is a table setting forth a preferred schedule for ordering the operations shown in FIGS. 4 and 5 for performing the DCT transform;

FIG. 9 is a table setting forth a preferred schedule for ordering the operations shown in FIGS. 7 and 9 for performing the IDCT transform.

DESCRIPTION OF THE PREFERRED EMBODIMENTS

Figure 1:
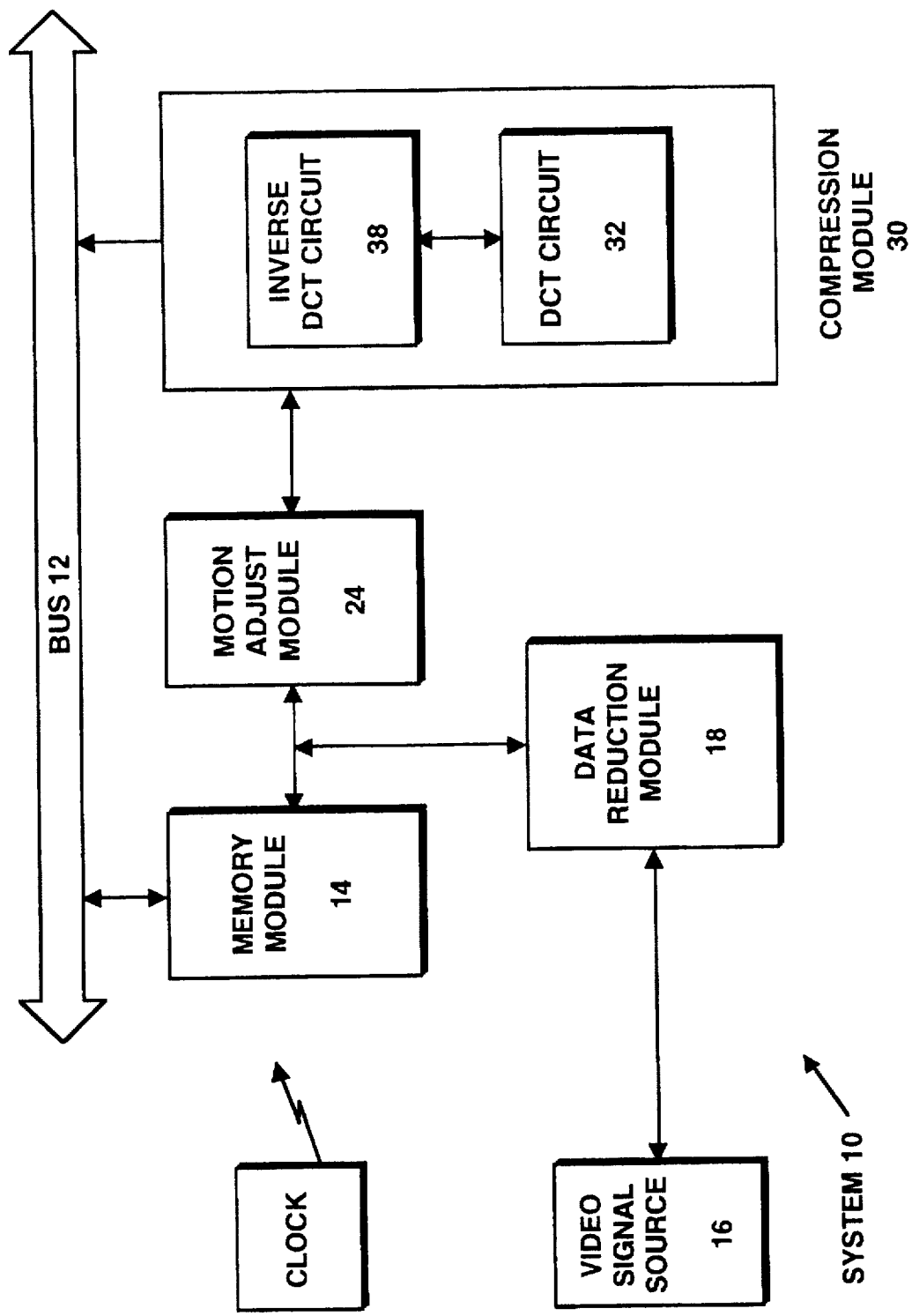
FIG. 1 is a block diagram showing a general system for compressing a video signal using the DCT and IDCT.

FIG. 1 shows a general video compression system 10. A video source 16, such as a camera, provides video signals for processing purposes to a data reduction module 18. The data reduction module 18 reduces the total amount of video data of a video image represented by the video signals by the use various operations that eliminate unnecessary and redundant signals. The data reduction module 18 provides signals to the main memory 14 for storage and also to a motion adjust module 24.

The motion adjust module 24 also reduces the amount of data required to perform the DCT and IDCT transformations for motion video by comparing a previous image to the current image to determine motion. The motion adjust module 24 calculates "difference information" between a "current" block of information and a "reference" block obtained from the memory module 14, (i.e., a "block" of information from a current image with a corresponding block of information from a previous image). The motion adjust module 24 supplies difference signals specifying the difference information to the memory 14 and to a compression module 30, which performs video data compression.

The compression module 30 has a DCT circuit 32 which performs a transformation of the current block of data from the spatial domain (i.e., real space) into the frequency domain. This transform removes much of the redundant spatial information, such as that provided by a picture of a uniform surface, thereby "compressing" the image. The DCT transform organizes the data from low frequency to high freequency so that quantization which takes into account the human visual system may be applied for further compression. The DCT circuit 32 then supplies the resulting compressed signals to an inverse DCT circuit 38, which completes the reverse transformation (i.e., frequency to spatial), and supplies the resulting signals back to the motion adjust module 24 for use in the next motion compensation calculation. The compression module 30 provides compressed image signals to the memory 14 for storage, and to the bus 12 for transmission.

Figure 2:
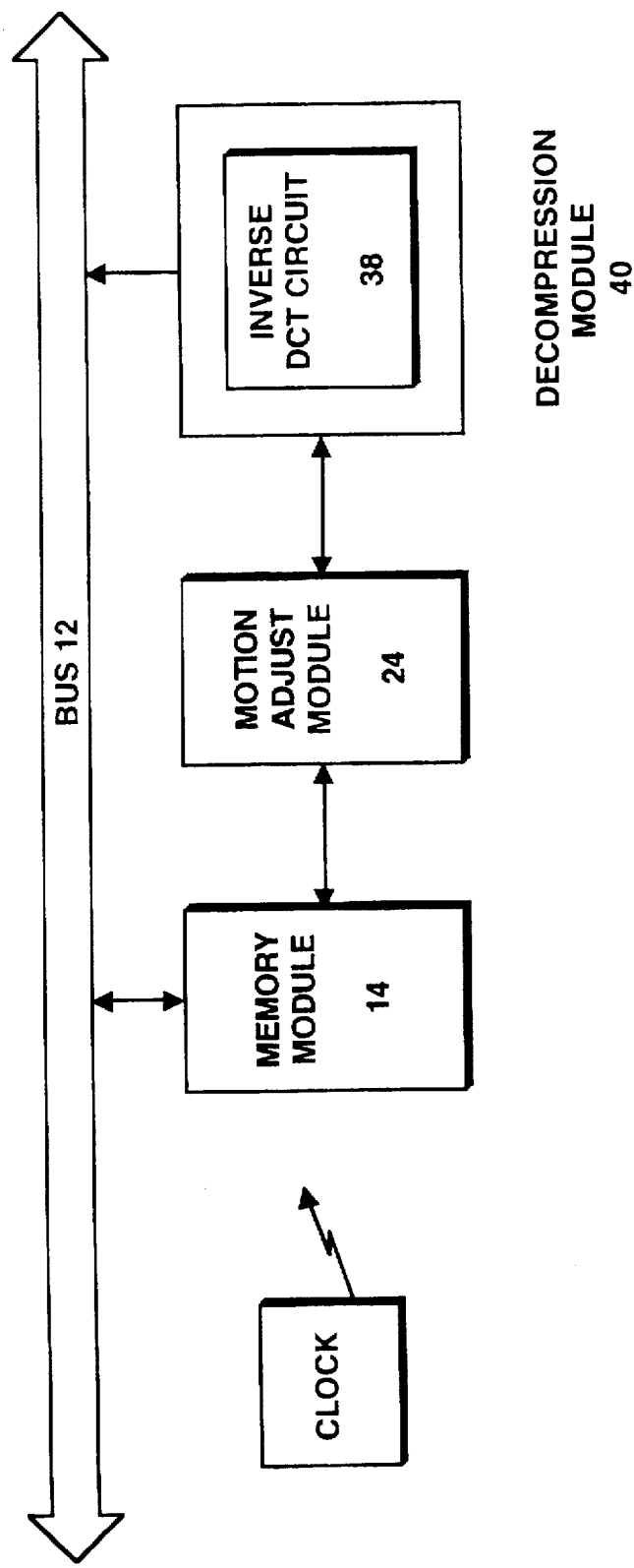
FIG. 2 is a block diagram showing a general system for decompressing a video image using the IDCT.

System 10 will now be described with respect to the decompression of a video signal, as depicted in FIG. 2. It should be emphasized that compression and decompression can be performed by the same physical components of system 10 due to the symmetry achieved by the invention. Accordingly, the above description of the functions of the system components need not be repeated here. In summary, the memory 14, provides compressed video signals to the motion compensator 28. The motion compensator 28 provides signals to the decompression module 40, which contains the inverse DCT unit 38. The inverse DCT unit 38 provides the decompressed video signals back to the motion compensator 28, which provides the signals to the memory 14 for storage. Memory 14 provides the decompressed video signals to bus 12, which carries the signals for example, to a monitor (not shown) for display.

Figure 3A:
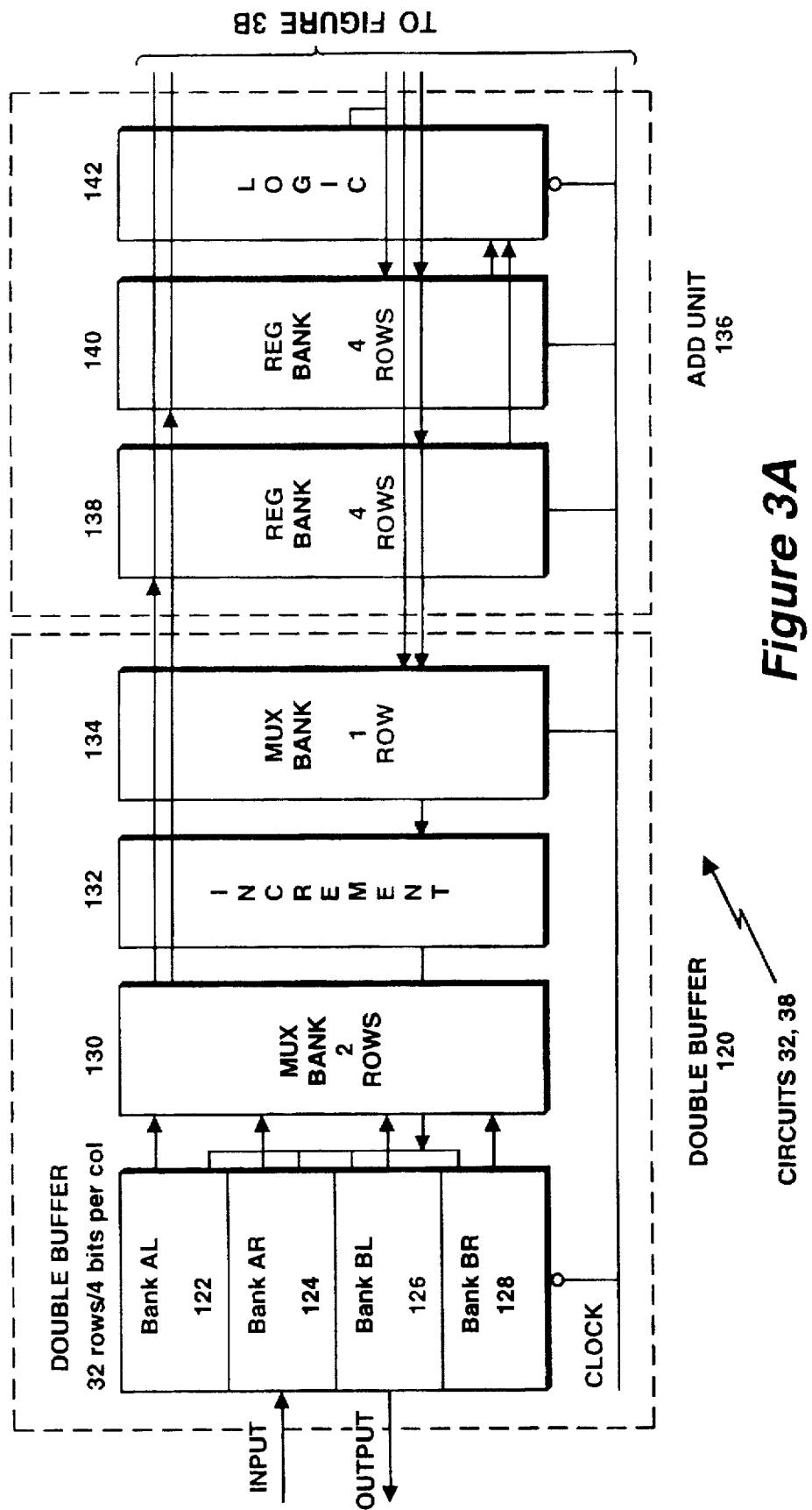
FIG. 3 is a block diagram of a preferred implementation of the DCT and IDCT circuits of FIG. 1 and FIG. 2 in accordance with the present invention.
Figure 3B:
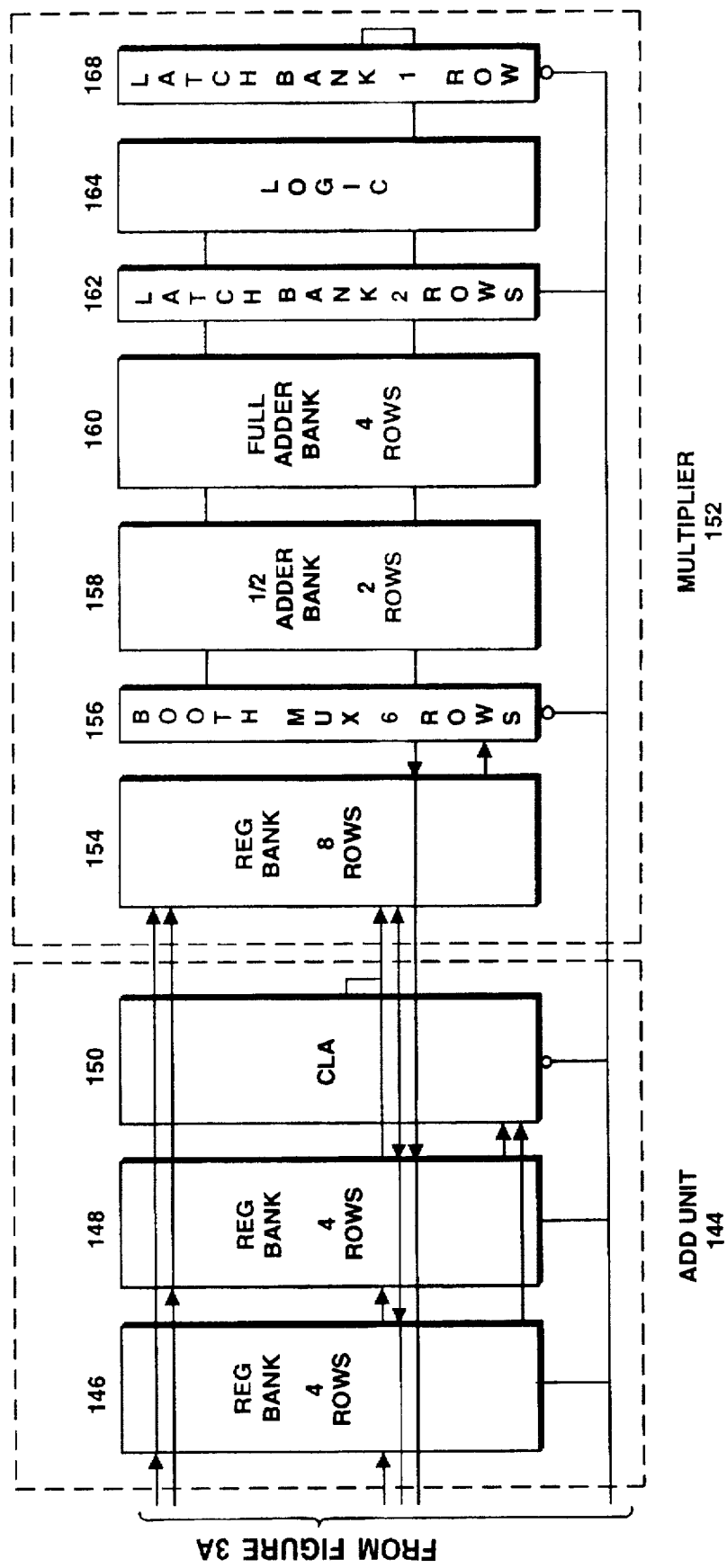

FIG. 3 shows a preferred implementation for the DCT circuit 32 and the IDCT circuit 38 of FIGS. 1 and 2 using a minimum of hardware required to achieve the precision specified by H.261 Annex A. Circuit 32, 38 has four functional units 120, 136, 144 and 152.

The first functional unit 120 is a buffer operand store, which is divided into two memory banks A and B, each having a left half 122, 126 and a right half 124, 128, and two multiplexers 130 and 134. Functional unit 120 preferably is a double buffer of at least 12 bits width, so that the system 10 may schedule and run one video block worth of data through either the DCT or the IDCT, and also, at the same time, either send the previous data block to the display (not shown) or to storage, or receive a next video block worth of data. This allows the system 10 constantly to perform calculations and not sit idle while it waits for data to be sent and/or received. This is known as 'pipelining' in the art.

Incrementer 132 contributes to achieving the accuracy of the H.261 Recommendation Annex A for the IDCT. Incrementer 132 takes every transform DCT or IDCT element value prior to storage in the double buffer (for future use in the column transform), and rounds the value away from zero UNLESS the value is negative and relative to the radix point is exactly 0.5, in which case truncation is performed, which effectively rounds away from zero.

The second and third functional units 136 and 144, are one clock cycle adders of at least 17 bits in data width, each with associated memory storage registers 138, 140, 146 and 148, for intermediate value storage, and two logic functional units 142 and 150. Minimizing the amount of intermediate storage via proper scheduling, as described below, is a factor in achieving efficiency and speed. Each of the memory storage registers has one read and two write ports, so that simultaneous storage and data reading operations can be performed.

The fourth functional unit 152 is a two cycle multiplier having a half adder 158, a full adder 160, immediate storage registers 162 and 168, a multiplexer 156, and a memory storage register for intermediate value storage in register bank 154. The preferred multiplicand width is 18 bits and the multiplex width is preferrable 13 bits in width.

By distributing memory storage throughout the functional units 158, 160 164 of the circuits 32, 38, as registers 154, 162 and 168, the amount of time necessary for one of the functional units 158, 160 164 to obtain the specific values needed for a calculation is reduced, thus increasing speed. Also by distributing the registers the number of read and write ports needed are minimized, thus conserving circuit area.

Figure 4A:
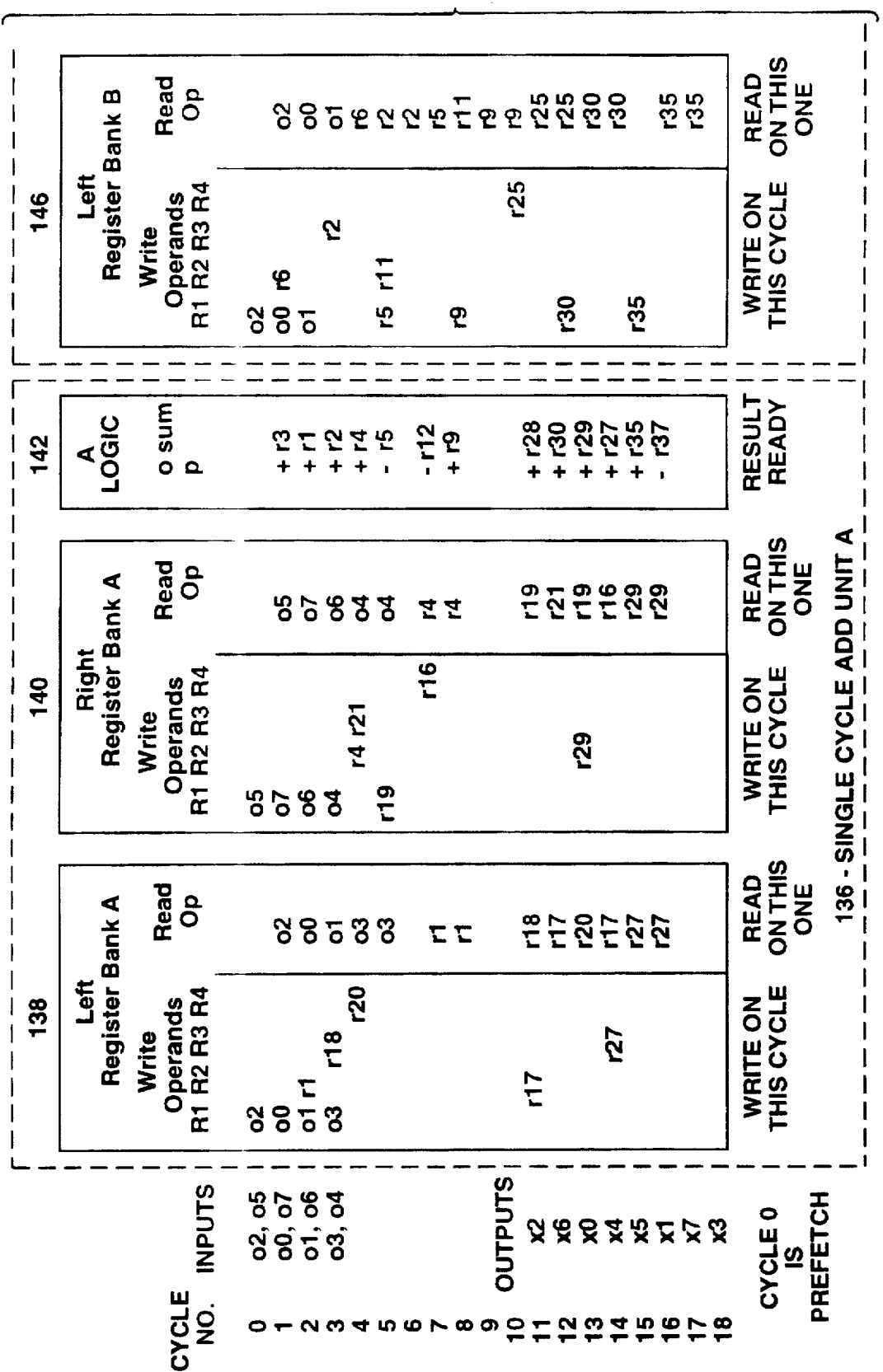
FIG. 4 is a chart setting forth a preferred allocation of storage registers to adders and multipliers and per cycle scheduling as depicted in FIG. 3.
Figure 4B:
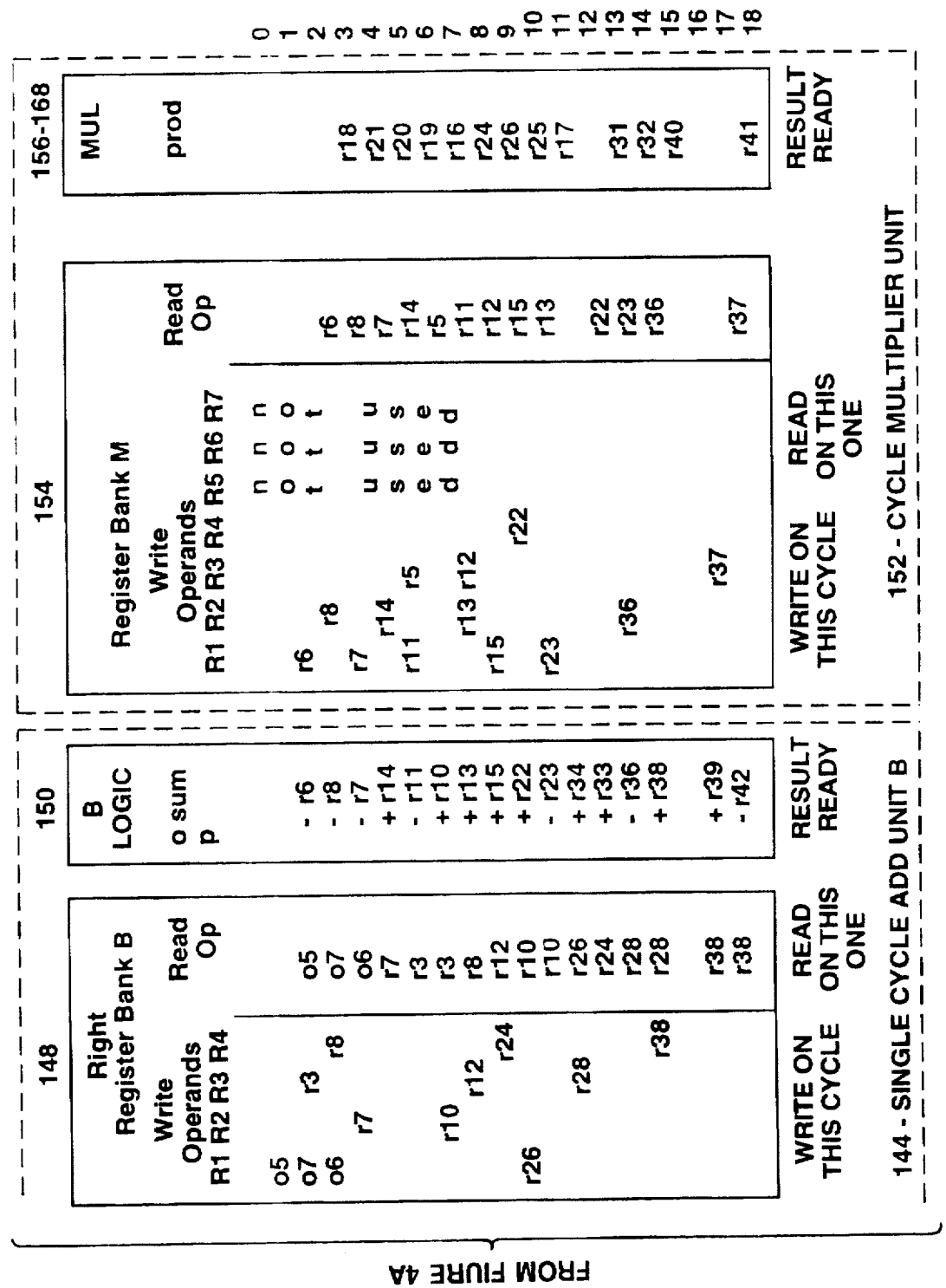

FIG. 4 shows a preferred assignment of memory registers to functional units in which all registers have two write ports and one read port. The order of operations is arranged so that no more than two previously stored intermediate values, typically called "operands", need to be fetched during each cycle from the double buffer 120. If the double buffer 120 is separated into a left operand buffer and a right operand buffer, then a single READ port per double buffer element is all that is required, which minimizes circuit area. As an example of how to read the schedule shown in FIG. 4, at cycle no. 0, operand 2 and operand 5 (denoted o2 and o5) are fetched in cycle 0 so that they may be used (i.e., read) in cycle 1. Note that Operand 2 corresponds to line 104, labeled x[2], at the point marked 92, of FIG. 5. The functional unit 142 is the adder circuit which will add o2 and o5 (denoted by the (+) symbol in functional unit 142) to produce a value to be stored in register 3 (i.e., r3) at the end of the cycle. The r3 value is then stored in memory register 148. Memory register 148 will read r3 in cycles numbered 5 and 6, to allow functional unit 150 to produce the values to be stored in memory registers r11 and r10 via a subtraction (denoted by the (−) symbol in functional unit 142) and then an addition (+). The value in memory register r11 from functional unit 150 will be stored (i.e., written) into memory register 154 in write operand R1 as well as memory register 146 in write operand R2.

It is important to schedule the operations such that only one transform resulting operand is produced per cycle because the first destination of this operand is an incrementer circuit 132, and then the double buffer 120. If multiple operands are produced, then multiple incrementers and a multi-write ported double buffer structure is required which typically would have adverse circuit area consequences.

Figure 5:
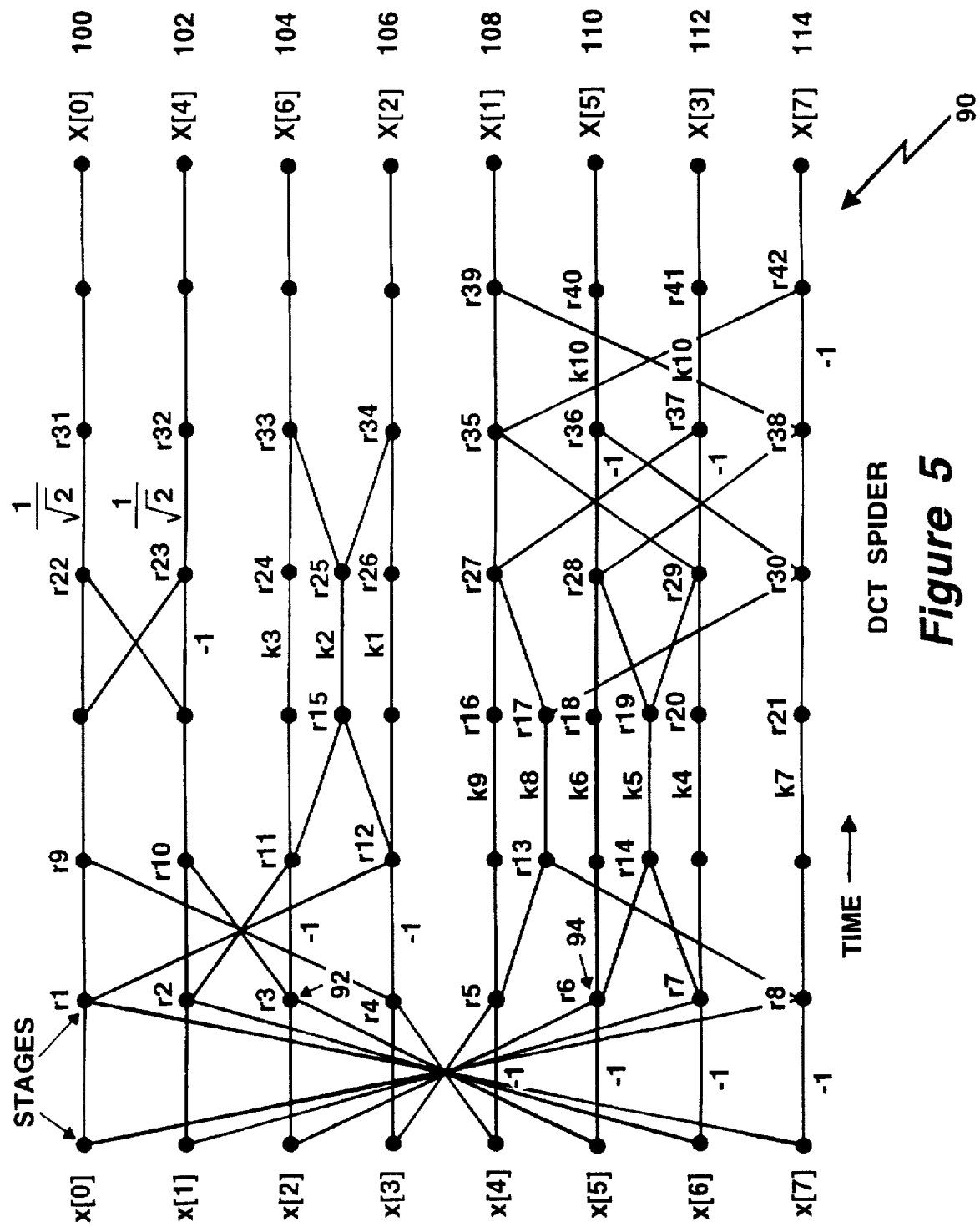
FIG. 5 is a 'spider diagram' showing a preferred order of operations used by the DCT circuit of FIG. 1 in efficiently performing an 1×8 point DCT add and multiply transform in accordance with the present invention.

It is also possible to display the preceding sequence of operations in the form of a "spider diagram" such as that shown in FIG. 5. FIG. 5 shows a "spider diagram" 90, which depicts a DCT transform in accordance with the invention for a block of video data that is one pixel wide by eight pixels tall. Each pixel in this drawing is represented by individual ones of the lines 100–114. Where two lines meet at a dot an addition occurs, e.g., the value X[2] on line 104, has the value X[5] from line 110 added at the intersection of the dot labeled 92 in diagram 90, and like wise the value X[2] from line 104 is added to the value X[5] at the dot labeled 94 on line 110. Where there is a −1 below the horizontal line, a subtraction occurs. Numbers prefixed 'k' above the lines 100–114 indicate that multiplications occur at that dot. Numbers prefixed 'r' indicate which memory registers are holding the results of the preceding mathematical operations.

Performing the indicated operations in the correct order, such as the preferred order shown in FIG. 5, is an important factor in developing an optimal solution to efficiently performing the DCT operation. A significant point is to schedule the various operations as shown in FIG. 5, so as to keep all the functional units 138–168 busy, while still minimizing the amount of memory storage required for the intermediate results.

It should be noted that the FIGS. 4 and 5 demonstrate the parallel nature of the mathematical operations, which improves the speed of operation of the calculations necessary to perform the DCT. Using the preferred memory to functional unit association and the preferred order of operations, as shown in FIGS. 4 and 5, allows the parallel operations to occur without any loss of time waiting for an intermediate memory register to become available.

FIG. 6 shows a table 96 with a preferred functional unit to memory register allocation, and a preferred ordering of operations for the DCT operation of FIGS. 1, 4 and 5. The stages 1–18 of FIG. 6 correspond to the cycles No. 1–18 of FIG. 4, and each of the indicated operations in FIG. 4 corresponds to one of the dots in FIG. 5. The theoretical minimum number of operations for a DCT system having 2 adders and 1 multiplier is 15 cycles. This schedule can be implemented but requires a multiplier that can perform within a single cycle. Since circuit area is directly related to multiplier speed, a smaller and more area efficient circuit may be achieved if the multiplier used has a two cycle pipelined function, i.e., two multiplications occurring simultaneously one cycle behind the other. The use of a two cycle pipelined multiplier has a scheduling cost of two cycles in the overall 1×8 DCT function, resulting in a complete DCT operation in 17 cycles.

Also seen in FIG. 6 is that the operation in Stage 18 (which is equivalent to cycle 18) is the same as one of the operation of Stage 17, and therefore may be collapsed into Stage 17. This would result in a DCT operation that is completed in 17 stages instead of the 18 stages shown. This is not done in the preferred embodiment because a typical control unit for performing both the DCT and IDCT is simplified if both functions execute in the same number of cycles/stages, ie. are symmetrical. This simplification of the circuit manifests itself as a reduction in circuit area. Since the IDCT will be shown later to require 18 stages to perform, therefore the DCT may be spaced out to require 18 cycles without loss of efficiency. This spacing of the DCT also reduces a write port requirement for a temporary storage bank.

Direct assignment of the memory storage 'r' registers to a specific functional unit (i.e., adder or multiplier) minimizes lost speed in long wire routs, and minimizes circuit area. Memory storage registers increase in circuit area as the number of read and write ports increases. Association of a register to a functional unit minimizes read port requirements to 1 (i.e., the theoretical minimum) and decreases circuit area. Proper functional unit to associated memory operation scheduling minimizes the write port requirements and thereby decreases circuit area. Regular memory structures are denser in physical layout than irregular structures. Therefore, implementing regular memory structures is a goal in designing efficient circuits.

Figure 7A:
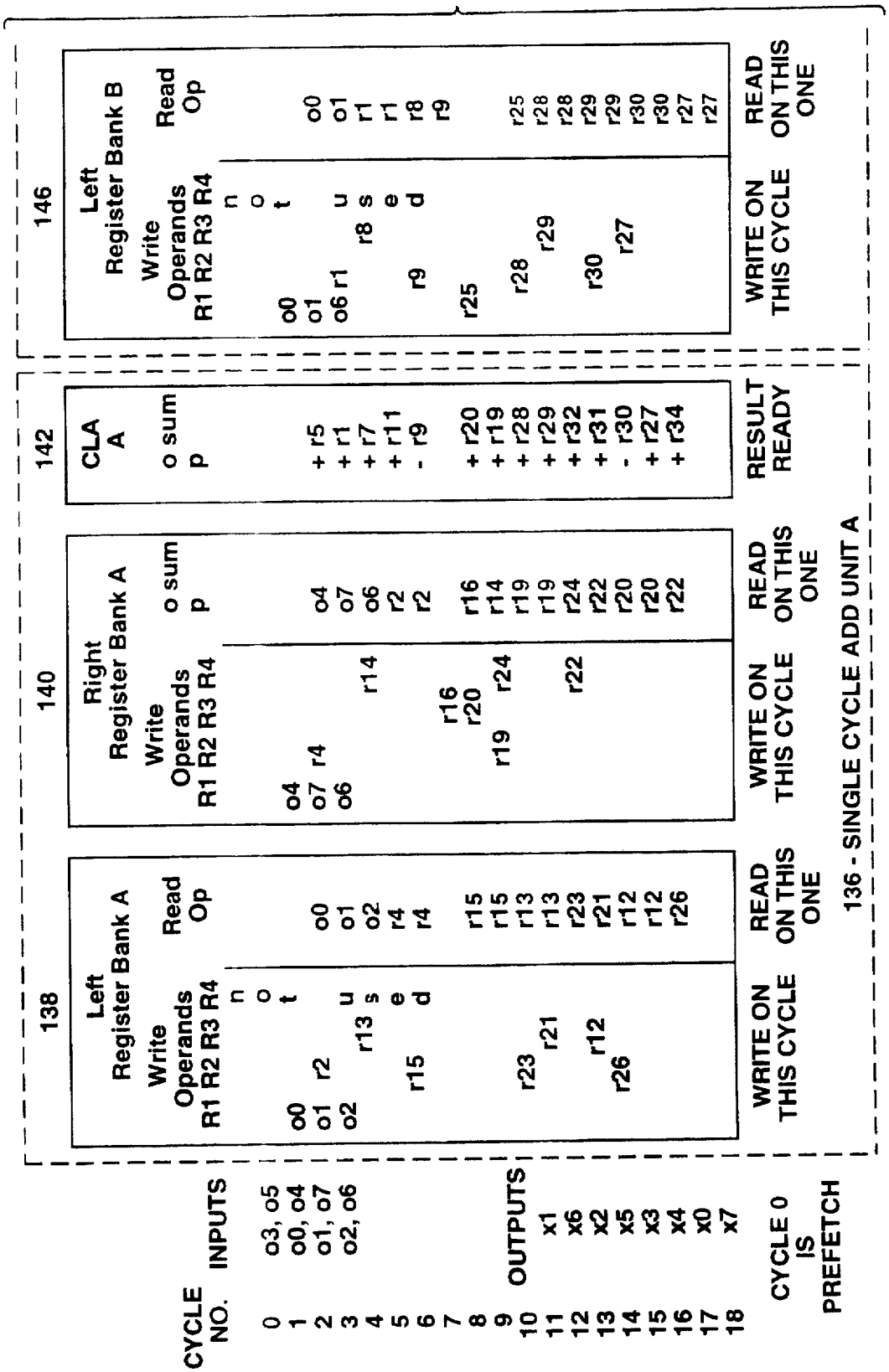
FIG. 7 is a chart setting forth a preferred allocation of storage registers to adders and multipliers and per cycle scheduling for performing the IDCT transform.
Figure 7B:
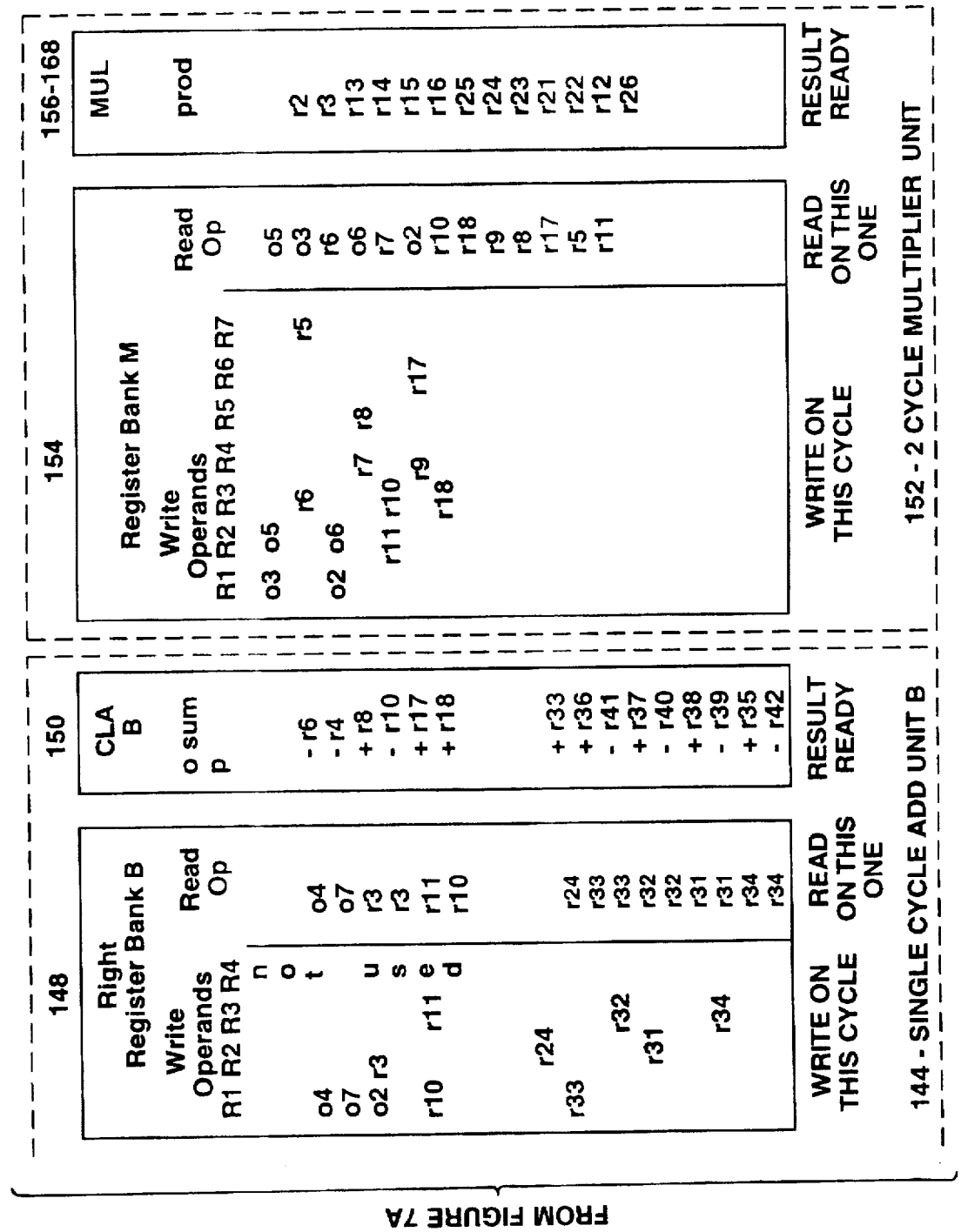

FIG. 7 shows a preferred memory register to functional unit association in a distributed register DCT implementation shows an optimal register functional unit association in a distributed register IDCT implementation. The elements and function of the Figure are similar to the discussion above with reference to FIG. 4, and need not be repeated here.

Figure 8:
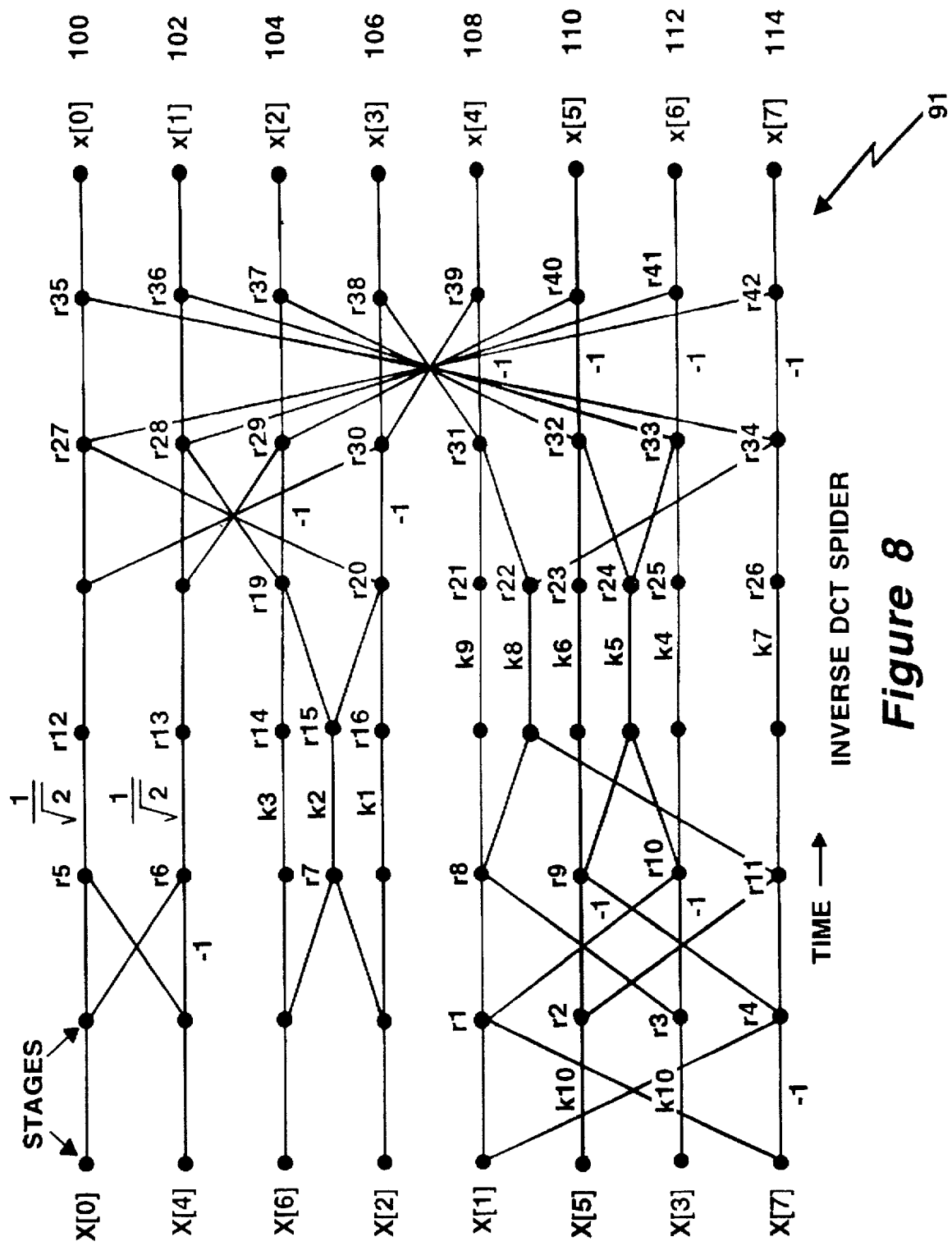
FIG. 8 is a 'spider diagram' showing a preferred order of operations used by the IDCT circuit of FIG. 2 in efficiently performing an 1×8 point IDCT transform.

FIG. 8 shows the scheduling and operation of the Inverse Discrete Cosine Transform (IDCT) of FIGS. 2 and 7 in the form of another 'spider diagram' labeled 91. It can be seen by comparing this figure to the DCT 'spider diagram' FIG. 5, that a preferred implementation of the IDCT is not simply the reverse of the DCT, and the memory register allocation and operation order are different although the physical registers may be the same.

Again the correct order of operation is important to developing an efficient solution. An important point is to schedule the additions and multiplications so as to keep all the functional units busy, while still minimizing the amount of memory storage required for the intermediate results.

FIG. 9 shows a table 98 with a preferred functional unit to memory register allocation, and a preferred ordering of operations for the IDCT of FIGS. 2, 7 and 8. This preferred order of operations has 2 stages more than the theoretical minimum of 16 cycles for a system with two adders and one 2-cycle multiplier for performing the IDCT shown in FIGS. 7 and 8. This is again due to the use of the 2-cycle multiplier, as described above with reference to FIG. 6.

Having described a preferred embodiment of the invention, it will now become apparent to one of skill in the art that other embodiments incorporating its concepts may be used. It is felt therefore, that this invention should not be limited to the disclosed embodiment, but rather should be limited only by the spirit and scope of the appended claims.

What is claimed is:

1. An apparatus for video signal compression and decompression utilizing a discrete cosine transform and an inverse discrete cosine transform, comprising:

means for receiving a video signal, and performing a discrete cosine transform and an inverse discrete cosine transform on said video signal, including a plurality of functional units for performing a set of mathematical operations on said video signal, said mathematical operations comprising said discrete cosine transform and said inverse discrete cosine transform, said functional units generating a plurality of intermediate calculated values from said video signal in performing said transforms, said functional units comprising first and second adder circuits and at least one multiplier circuit, where each of said adder circuits includes one adder and a plurality of memory register circuits coupled with said adder for storing said intermediate calculated values, and each said at least one multiplier circuit includes one multiplier and a plurality of memory registers coupled with said multiplier for storing said intermediate calculated values, said adder circuits and said at least one multiplier circuit together performing said discrete cosine transform and said inverse discrete cosine transform to generate at least one of a compressed video signal and a decompressed video signal.

2. The apparatus of claim 1 wherein said first and said second adder circuits each contain four associated memory register circuits.

3. The apparatus of claim 1 wherein each of said at least one multiplier circuit contains seven associated memory register circuits.

4. The apparatus of claim 1 wherein said functional units comprise two adder circuits and one multiplier circuit.

5. The apparatus of claim 4 wherein each of said two adder circuits contain four associated memory register circuits.

6. The apparatus of claim 4 wherein said multiplier circuit contains seven associated memory register circuits.

7. The apparatus of claim 1 wherein said apparatus performs video signal compression utilizing said discrete cosine transform and said inverse discrete cosine transform to generate said video signal compression.

8. The apparatus of claim 1 wherein said apparatus performs video signal decompression on a previously compressed video signal utilizing said inverse discrete cosine transform to generate said video signal decompression.

9. An apparatus for video signal compression and decompression utilizing a discrete cosine transform and an inverse discrete cosine transform, comprising:

means for receiving a video signal, and performing a discrete cosine transform and an inverse discrete cosine transform on said video signal, including a plurality of functional units for performing a set of mathematical operations on said video signal, said mathematical operations comprising said discrete cosine transform and said inverse discrete cosine transform, said functional units generating a plurality of intermediate calculated values from said video signal in performing said transforms, said functional units comprising first and second adder circuits and one multiplier circuit, where each of said adder circuits includes one adder and a plurality of memory register circuits coupled with said adder, and where said multiplier circuit includes one multiplier and a plurality of memory registers coupled with said multiplier, said adder circuits and said multiplier circuit together performing said discrete cosine transform and said inverse discrete cosine transform to generate at least one of a compressed video signal and a decompressed video signal, a plurality of memory units having a distributed structure, each of said plurality of memory units connected to and associated with a corresponding one of said plurality of functional units, said memory units storing said at least one of said compressed and decompressed video signals, a double buffer circuit having a first memory bank and a second memory bank, each of said memory banks having a first side and a second side, each of said sides of said memory banks of said double buffer circuit being connected to, and associated with a corresponding one of said plurality of functional units, and an incrementer circuit coupled to said double buffer circuit and said plurality of functional units and having means for rounding said intermediate calculated values to produce rounded intermediate calculated values prior to storage of said rounded intermediate calculated values in said double buffer memory banks.

10. The apparatus of claim 9 wherein each of said first and said second adder circuits contain four associated memory register circuits.

11. The apparatus of claim 9 wherein each said multiplier circuits contain seven associated memory register circuits.

12. The apparatus of claim 9 wherein further, said functional units perform both of said discrete cosine transform and said inverse discrete cosine transform in the same quantity of time.

13. The apparatus of claim 12 wherein further the order of the operations of said functional units is ordered such that smaller numbers are added together before additions to larger numbers are performed.

14. In a video image processing system having a plurality of distributed memory storage elements, a method for compression and decompression of a video image utilizing a discrete cosine transform and an inverse discrete cosine transform, comprising the steps of:

A. using said video image, calculating a current image to prior image reference image difference value in a motion adjust module, B. calculating a Discrete Cosine transformation value of said video signal in a Discrete Cosine transformation circuit, C. transferring said Discrete Cosine transformation value to an assigned one memory element of said plurality of distributed memory storage elements, coupled directly to said Discrete Cosine transformation circuit and to an inverse Discrete Cosine transformation circuit, D. calculating an inverse Discrete Cosine transformation value using said Discrete Cosine transformation value, E. transferring said inverse Discrete Cosine transformation value to said motion adjust module, F. transferring a frame to frame difference value to an assigned one memory element of said Plurality of distributed memory storage elements, coupled directly to said inverse Discrete Cosine transformation circuit, G. scheduling said transform calculations to avoid having two or more intermediate results during the same time interval, and H. transferring an electrical signal representing a compressed video image to an output means.

15. The method of claim 14 wherein said memory further comprises:

a RAM cell block buffer which is segmented into a left operand and a right operand section, such that a single read port is used per side.

16. The method of claim 15 wherein a Read operation never overlaps a Write operation.

17. The method of claim 16 wherein the storage of the operands and the reading of operands is scheduled such that a transpose matrix operation does not require additional memory space.

* * * * *